(12) United States Patent  (10) Patent No.: US 7,773,825 B2
Niikura et al.  (45) Date of Patent: Aug. 10, 2010

(54) IMAGE STABILIZATION APPARATUS, METHOD THEREOF, AND PROGRAM PRODUCT THEREOF

(75) Inventors: Kentarou Niikura, Kanagawa (JP);
Kazuhiko Takami, Kanagawa (JP);
Takashi Nishida, Ishikawa (JP);
Akitaka Oya, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 920 days.

(21) Appl. No.: 11/590,815

(22) Filed: Nov. 1, 2006

(65) Prior Publication Data

US 2007/0098291 A1  May 3, 2007

(30) Foreign Application Priority Data

Nov. 2, 2005  (JP) .............................. 2005-319986

(51) Int. Cl.
*G06K 9/40*  (2006.01)
*H04N 5/228*  (2006.01)

(52) U.S. Cl. ..................... 382/274; 382/254; 348/208.4

(58) Field of Classification Search ................. 382/274, 382/254; 348/208.1, 208.14, 208.3, 208.4, 348/208.6, 208.99, 221.1, 362; 396/238, 396/215, 161
See application file for complete search history.

(56) References Cited

U.S. PATENT DOCUMENTS 7,386,228 B2 *  6/2008  Okada ......................... 396/238

7,424,213 B2 *  9/2008  Imada ......................... 396/55
2004/0145673 A1  7/2004  Washisu

FOREIGN PATENT DOCUMENTS

| EP | 0 388 936 A2 | 9/1990 |
|---|---|---|
| EP | 1 377 036 A2 | 1/2004 |
| JP | 7-177425 | 7/1995 |
| JP | 8-163566 | 6/1996 |
| JP | 8-254173 | 9/1996 |
| JP | 2001-223932 | 8/2001 |
| JP | 2004-219765 | 8/2004 |
| JP | 2004-221992 | 8/2004 |
| JP | 2005-227812 | 8/2005 |
| JP | 2005-295302 | 10/2005 |
| JP | 2006-148550 | 6/2006 |

OTHER PUBLICATIONS

Japanese Patent Office issued a Japanese Office Action dated Mar. 16, 2010, Application No. 2005-319986.
Japanese Patent Office issued a Japanese Office Action dated Dec. 8, 2009, Application No. 2005-319986.

* cited by examiner

*Primary Examiner*—Yon Couso
(74) *Attorney, Agent, or Firm*—Young & Thompson

(57) ABSTRACT

An image stabilization apparatus of the present invention includes a detection unit which detects an amount of an image blur between a plurality of image data, an evaluation unit which selects at least one image data to use in correcting image blur from the plurality of image data according to a result of the detection of the amount of image blur, and a correction unit which generates image data with its image blur corrected using the image data selected by the evaluation unit.

19 Claims, 5 Drawing Sheets

IMAGE STABILIZATION APPARATUS, METHOD THEREOF, AND PROGRAM PRODUCT THEREOF

BACKGROUND OF THE INVENTION

1. Field of the Invention

The present invention relates to an image processing technology for correcting an image blur generated in image data.

2. Description of Related Art

In an imaging apparatus for converting an electric signal obtained from an image pickup device such as CCD (Charge Coupled Device) into a digital signal to obtain image data, a technique is known in the art, the technology for correcting a blur (hereinafter referred to as an image blur) generated in the image data due to camera shake. For such an image stabilization technique, various techniques are suggested including a method for detecting an amount of the image blur and a method for correcting the image blur using a detected motion vector.

A general operation of an image processing apparatus for correcting the image blur of image data obtained by an imaging apparatus for capturing a still image is described hereinafter in detail. Firstly the image processing apparatus inputs image data of a plurality of frames consecutively captured in response to a shutter pressed by a user. Then the image processing apparatus compares the image data of the plurality of frames being obtained in order to calculate a direction and a magnitude of the image blur (hereinafter referred to as a motion vector). Lastly pixel positions are shifted in order to cancel out the calculated motion vector and the plurality of image data are superposed. This creates the image with reduced image blur.

For example an image processing apparatus disclosed in Japanese Unexamined Patent Application Publication No. 2005-295302 extracts a pixel having a large difference in pixel value from an adjacent pixel as a feature pixel, and evaluates a pixel displacement of the feature pixel among the image data of the plurality of frames. Then the image processing apparatus shifts the image data of the plurality of frames so as to correct the displacement of the feature pixel.

Further, various methods of calculating the motion vector are suggested. For example the image processing apparatus disclosed in Japanese Unexamined Patent Application Publication No. 2005-295302 calculates the motion vector by evaluating a motion of the feature pixel. There is another method of calculating the motion vector from a correlation of pixel values for each block (see Japanese Unexamined Patent Application Publication No. 8-163566 and Japanese Unexamined Patent Application Publication No. 7-177425, for example).

Another method for evaluating a characteristic of the image blur from the direction of the calculated motion vector has conventionally been suggested. An imaging apparatus disclosed in Japanese Unexamined Patent Application Publication No. 8-251473 evaluates the characteristic of the motion vector by comparing the motion vector calculated for the captured image data with a peripheral motion vector so as to evaluate the image blur characteristic is due to a moving subject crossing the captured image. The imaging apparatus determines not to correct the image blur in case the evaluation suggests the image blur characteristics is due to a moving subject crossing the captured image.

In correcting the image blur by superposing the image data of the plurality of frames, image data not suitable for correcting the image blur by the superposition may be included in the plurality of image data. One of the image data not suitable for the image stabilization by the superposition is image data in which a spatial frequency of the image data is too high or low as a whole, so that the motion vector cannot be detected due to the small number of pixels to be feature points. Another image data not suitable for the image stabilization is image data in which a part of the image data is moving while being captured and image data including camera shake of rotation direction. Correcting the image blur by superposing the plurality of image data that includes such image data would deteriorate image quality, creating unnatural image after correcting the image blur.

As described in the foregoing, in correcting the image blur by superposing the plurality of image data, it has now been discovered that the image data after correcting its image blur could be deteriorated in case the plurality of image data include image not suitable for the correction.

SUMMARY OF THE INVENTION

According to an aspect of the present invention, there is provided an image stabilization apparatus that includes a detection unit which detects an amount of an image blur between a plurality of image data, an evaluation unit which selects at least one image data to use in correcting image blur from the plurality of image data according to a result of the detection of the amount of image blur, a correction unit which generates image data with its image blur corrected using the image data selected by the evaluation unit.

With the abovementioned configuration, in case an image not suitable for a correction is included in the plurality of image data, the image data excluding the unsuitable image data may be selected as an image data to be used for the correction. This enables to select image data suitable for the correction to perform the image stabilization, thereby preventing from deteriorating image quality of the image data after the correction.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

Figure 1:
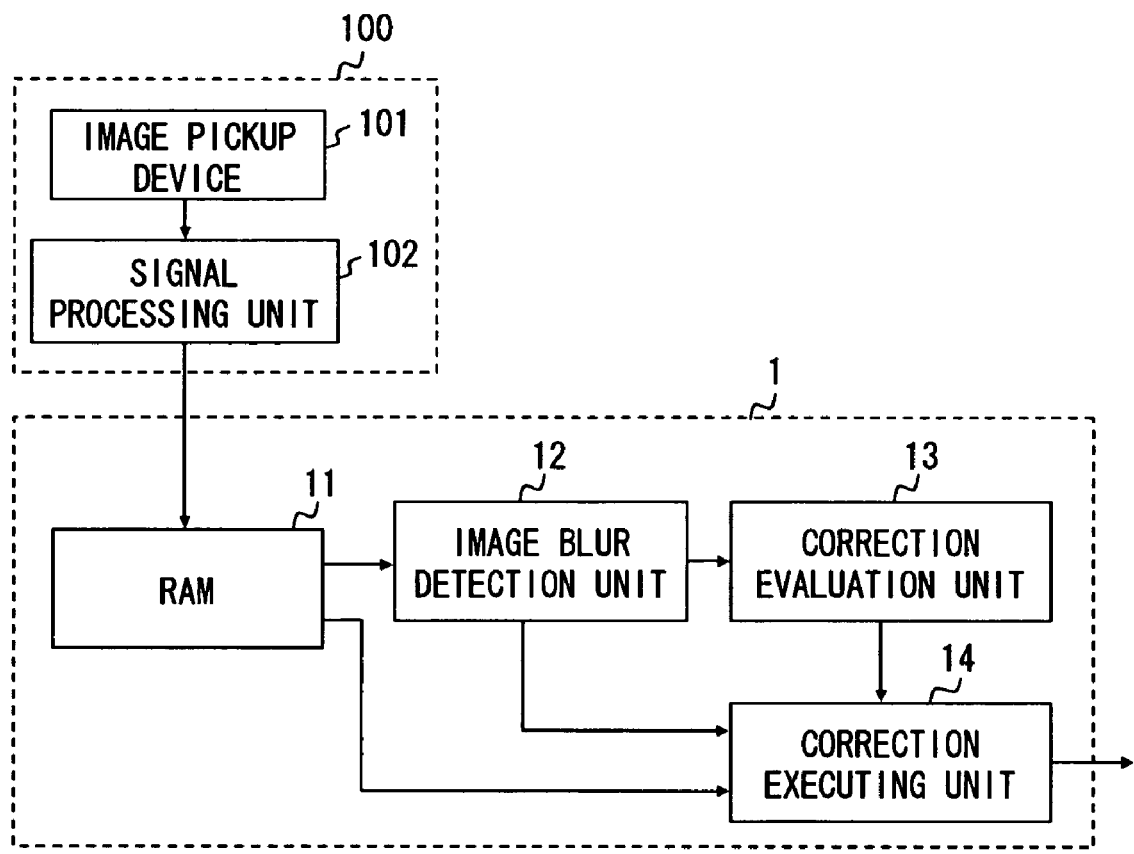
FIG. 1 is a functional block diagram illustrating an image stabilization apparatus according to first embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes. Components identical in the drawings are denoted with reference numerals with explanations omitted as necessary.

First Embodiment

A configuration of an image stabilization apparatus of this embodiment is shown in FIG. 1. The image stabilization apparatus 1 with an imaging unit 100 is mounted to an electronic equipment such as a digital camera for capturing a still image. The imaging unit 100 includes an image pickup device 101 such as CCD, and a signal processing unit 102. The signal processing unit 102 converts analog image data obtained by the image pickup device 101 into digital image data, adjusts white balance, performs an interpolation process so as to obtain RGB signals for each pixel, and then outputs RGB image data. Other than these mechanisms, the imaging unit 100 includes an electronic shutter mechanism for controlling exposure time of the image pickup device 101, a diaphragm control mechanism, and a gain control mechanism for adjusting signal level of an imaging signal.

The imaging unit 100 controls a shutter speed of the electronic shutter in response to a press of a shutter button of a camera by a user in order to capture an N frame. N is an integer having a value of at least 2. Thus, the imaging unit 100 captures images at an N-fold shutter speed of a specified shutter speed. The specified shutter speed refers to a shutter speed a camera user assumes in a manual mode and a shutter speed previously specified by a digital camera and the like in an automatic mode. The shutter speeds are collectively referred to as the specified shutter speed hereinafter. Assuming the specified shutter speed to be 1/30 second and the number of captured frames N to be 4, the imaging unit 100 captures 4 frames at a shutter speed of 1/120 second, which is 4 times the specified speed. N sheets of the image data captured at an increased speed are underexposed. By the image stabilization apparatus 1 superposing the image data or performing a multiplication process to luminance data, the image data can be corrected to have an appropriate exposure with reduced random noise and image blur.

A RAM (Random Access Memory) 11 included in the image stabilization apparatus 1 is a memory for storing image data having N frames that are consecutively captured by the imaging unit 100.

An image blur detection unit 12 compares the image data having N frames to each other that is stored to the RAM 11 so as to detect an amount of image blur between the image data. To detect the amount of image blur, only one color out of the three colors of RGB needs to be detected included in the image data. In this case, G signal has the highest visibility to humans as compared to other two signals and is the closest to a luminance signal. Thus G signal should be used for the detection. The image blur may be detected by converting image data comprised of R, G, and B signals into the luminance signal and a color-difference signal, and comparing the luminance signal of the image data.

A correction evaluation unit 13 selects one or a plurality of image data among the image data of N frames that are stored to the RAM 11 to be used to correct the image blur by a correction executing unit 14, described later in detail, depending on a characteristic of the image blur detected by the image blur detection unit 12. The correction evaluation unit 13 outputs a control signal for notifying the selected image data to the correction executing unit 14. In case of changing the process of the correction executing unit 14 depending on the position of the frame of the selected image data in an order of the consecutive N frame, or depending on the number of selected image data, a correction method that the correction executing unit 14 applies along with the information of the selected image data may be notified to the correction executing unit 14. The correction evaluation unit 13 may notify a correction method that the correction executing unit 14 applies instead of the information of the selected image data to the correction executing unit 14.

The correction executing unit 14 selectively retrieves image data from the RAM 11 to be used in an image stabilization by superposition in response to the control signal input from the correction evaluation unit 13. Then the selected image data is superposed with pixel positions shifted to cancel out the image blur detected by the image blur detection unit 12. After that, the correction execution unit 14 outputs image data with its image blur corrected by the superposition to an external memory and the like.

To generate image data by superposing image data of less than N frames that is selected from image data of N frames, a luminance of the image data with its image blur being corrected is adjusted so that the luminance of the image data after the correction is equal to a luminance of an image ordinary captured at the specified shutter speed, which is a luminance of the image data that the image of N frames are superposed. In other words, an exposure time of the image data after the correction is adjusted to have an exposure time corresponding to the specified shutter speed.

To be more specific, in case the selected image data has only 1 frame, the image data is corrected by multiplying the luminance of the selected data by N. That is, the image data after the correction is created by superposing N sheets of the selected image data. Furthermore, in case N is at least 4 and the selected image data is 3, by superposing one image selected from the three images for two times, the image of N frames can be created. Specifically, in creating 4 frames by image data of A, B, and C, one of the image data may be used twice. Further, to superpose three image data of 5 frames, some two of the three image data may be used twice, or some one of the three image data may be used three times and once for others.

Another method of luminance correction, wherein n is at least 4 and the selected image data is 3, is to multiply the luminance of the image data that includes 3 image data being superposed by N/3 to generate the corrected image data. Specifically, the luminance can be corrected by amplifying luminance data of each pixel at a specific scaling factor.

By the luminance correction as above, it is possible to generate the image data having the same luminance as the luminance expected at the specified shutter speed, regardless of the number of image data used for the correction. This creates a natural image to users of a digital camera and the like, bringing a great practical effect.

A detailed procedure of the image stabilization apparatus 1 of this embodiment is described hereinafter in detail with reference to a flowchart of FIG. 2. In case the correction evaluation unit 13 evaluates that there is at least one image data not suitable for a correction among the image data of N frames, the flowchart of FIG. 2 indicates processes for generating the image data after the correction using the image data of a first frame among the N frames.

In step S11, the image blur detection unit 12 reads out two image data to be compared for detecting the image blur from the RAM 11. There can be various combinations of the image data to be compared. In this example, the image blur is detected by comparing first image data being captured first and another image data among the image data of consecutive N frames. Combinations of the image data in N−1 ways are sequentially compared.

In step S12, the amount of image blur is detected for the combination of the image data being read out. The detection of the amount of image blur can be performed by the process of calculating the motion vector disclosed in Japanese Unexamined Patent Application Publication No. 2005-295302, 8-163566, 7-177425, and 8-251473. For example by dividing pixels included in the image data into a plurality of blocks, the motion vector for each block can be calculated.

In step S13, the amount of image blur detected in step S12 is evaluated whether it is suitable for the correction by the superposition. Specifically, in case the direction and the magnitude of the motion vector for each block that are calculated in step S12 are same for the entire image data, the image data of another frame compared with the first frame is evaluated to be the image data suitable for the correction by superposing with the first frame. With the motion vector being same in the entire image data, the image blur is corrected by regarding an average value of the motion vectors calculated for each block of each image data as the motion vectors representing the image data, and shifting pixel positions to cancel out the representing motion vectors so as to superpose a plurality of images.

Figure 3A:
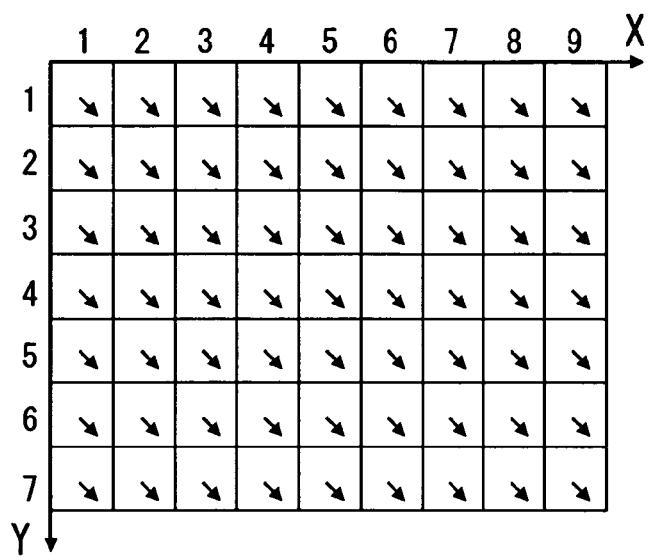
FIGS. 3A to 3C are views explaining a motion vector evaluation process conducted by the image stabilization apparatus according to first embodiment of the present invention.

FIG. 3A is a view showing the case in which motion vectors are same. FIG. 3A is a view illustrating the motion vectors of image data, with the image data divided into 9 blocks to X-axis direction and 7 blocks to Y-axis direction to calculate the motion vectors for the blocks. The motion vectors of the FIG. 3A have a certain magnitude to bottom right direction over the entire image.

Figure 3B:
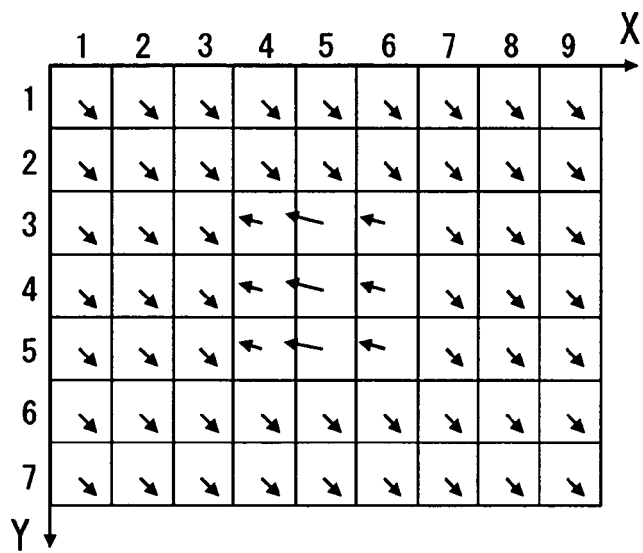

On the other hand as shown in FIG. 3B, in case the motion vectors of a central part of the image differ from other blocks, it is assumed that an subject is moving or a user is intentionally panning which his to move an optical axis of a camera. Correcting image blur by superposing a plurality of images including the image data having such motion vectors, the blur of the subject is emphasized. Accordingly the image data obtained by correcting image blur may be of a quality quite unlike the one user is expecting to be. Thus in case of having the motion vectors as in FIG. 3B, another image data compared to the first frame should be evaluated to be the image data not suitable for correcting image blur.

Figure 3C:
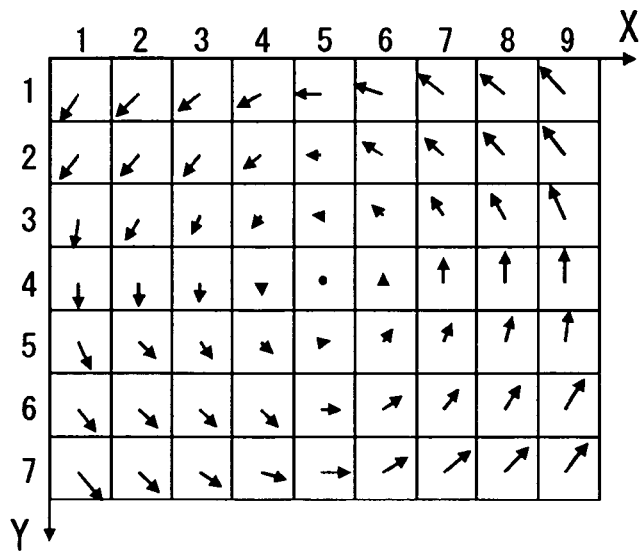

Furthermore in case as shown in FIG. 3C in which the motion vectors indicate an image blur of a rotation direction, another image data compared to the first frame should be evaluated to be the image data not suitable for correcting image blur. In case the correction executing unit 14 can rotate the image data to cancel out the motion vectors showing a rotation and superpose the image data, the image data as shown in FIG. 3C maybe evaluated to be the image data suitable for the correction.

In case the image data compared with the first image data is evaluated to be the image data suitable for the correction in step S13, proceed to step S14. In step S14, return to step S11 in case the correction evaluation unit 13 has not completed evaluating to the image data of the last N frame, so as to select an unevaluated image data to repeat the processes.

When completed to evaluate the motion vectors among the first image data and other N−1 sheets of image data, the correction executing unit 14 performs a superposition using the image data of all the N frames (step S15).

On the other hand in case it is evaluated that there is image data not suitable for the correction, the calculation of the motion vector and the image blur detection process based on the calculated motion vector are ended. In this case, the luminance of the first image data is N−folded, that is, N sheets of the first image data are superposed to generate the corrected image data (step S16).

In step S17, the image data with its image blur being corrected by the superposition is output and completed the process.

As described in the foregoing, in case there is image data not suitable for superposing to correct image blur in the image data of N sheets being captured, by superposing N sheets of the first image data, the image blur can be reduced as compared to capturing an image at the specified shutter speed. There are following advantageous effects in addition to this. Firstly, a deterioration of image quality such as an emphasis of subject blur can be suppressed because the image data not suitable for the correction is not included to be superposed.

Secondly, by selecting the first image data, an image having a smallest difference from a timing of pressing a shutter can be generated.

Thirdly, by previously specifying image data to be used for the correction, at a time of evaluating that there is image data not suitable for the correction by superposing, the evaluation of motion vectors thereinafter needs not to be performed and it is possible proceed to generate the corrected image data. This helps generate the corrected image data quickly.

The image stabilization apparatus 1 of this embodiment may be made up of a computer system having a MPU (Micro Processing Unit) that executes programs. Specifically, a program product storing a program of the procedure of the flowchart of FIG. 2 that is performed by the image blur detection unit 12, the correction evaluation unit 13, and the correction executing unit 14 needs to be stored to a storage unit such as ROM or flash memory. By executing the program by the MPU and coordinating the process of the MPU and a control of the RAM 11, a computer system can operate as the image stabilization apparatus 1.

Figure 2:
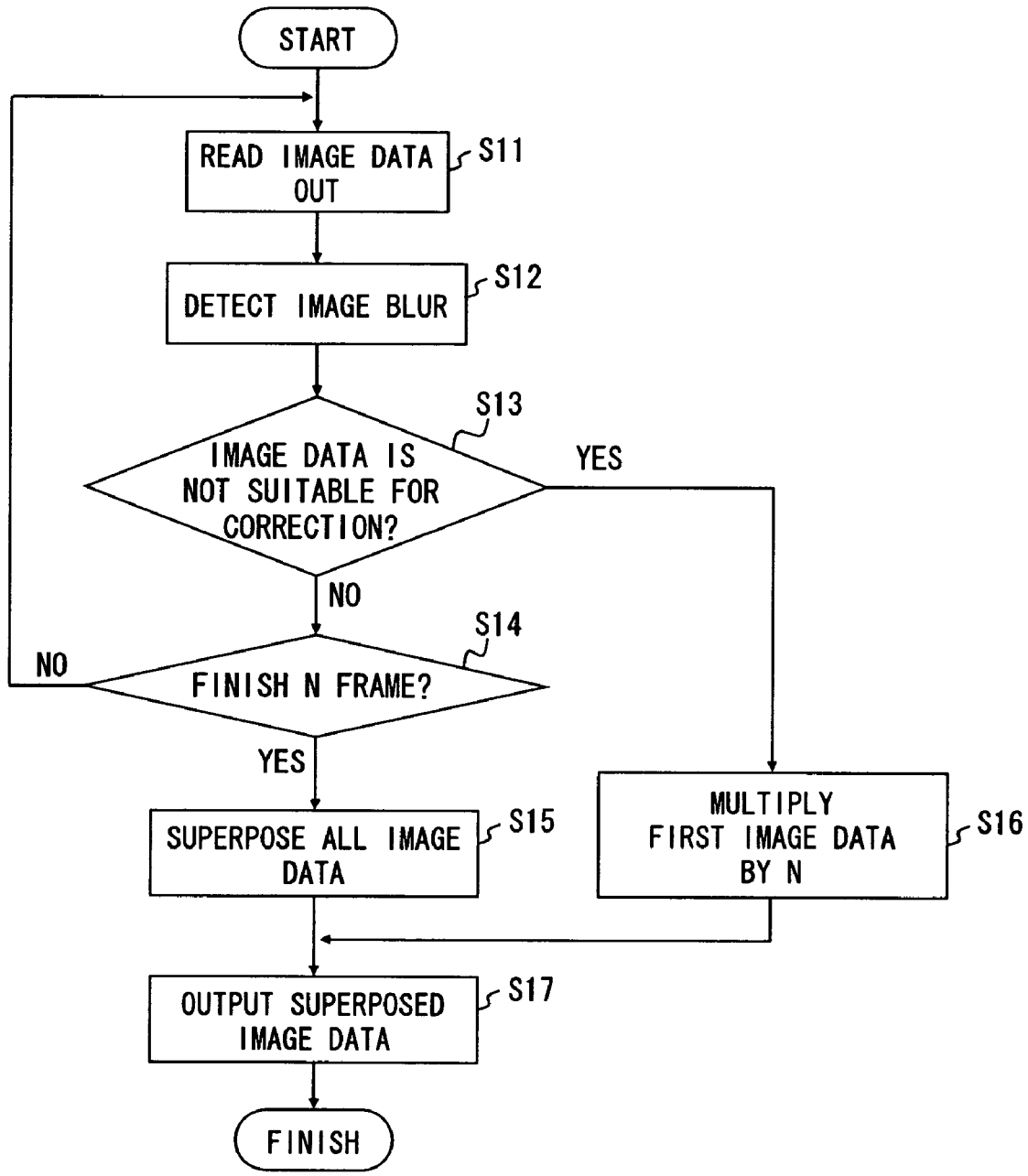
FIG. 2 is a flow chart illustrating an image stabilization method according to first embodiment of the present invention.

A program product storing the procedure of the flowchart shown in FIG. 2 may be stored to various types of storage media and not limited to ROM or flash memory. It also can be communicated through a communication medium. The storage medium includes a flexible disk, hard disk, magnetic disk, magnetic optical disk, CD-ROM, DVD, RAM memory cartridge with battery backup etc. The communication media includes a cable communication media such as telephone line, radio communication media such as microwave line, and internet.

In step S16 of FIG. 2, the luminance is corrected by superposing N sheets of the first image data. However the image data may be corrected by performing the multiplication process of luminance data as described above, specifically a process of multiplying a luminance of the first image data by N, the corrected image can be obtained. In this case, a circuit for the multiplication process needs to be added, however a memory for the superposition is not required.

Second Embodiment

Figure 4:
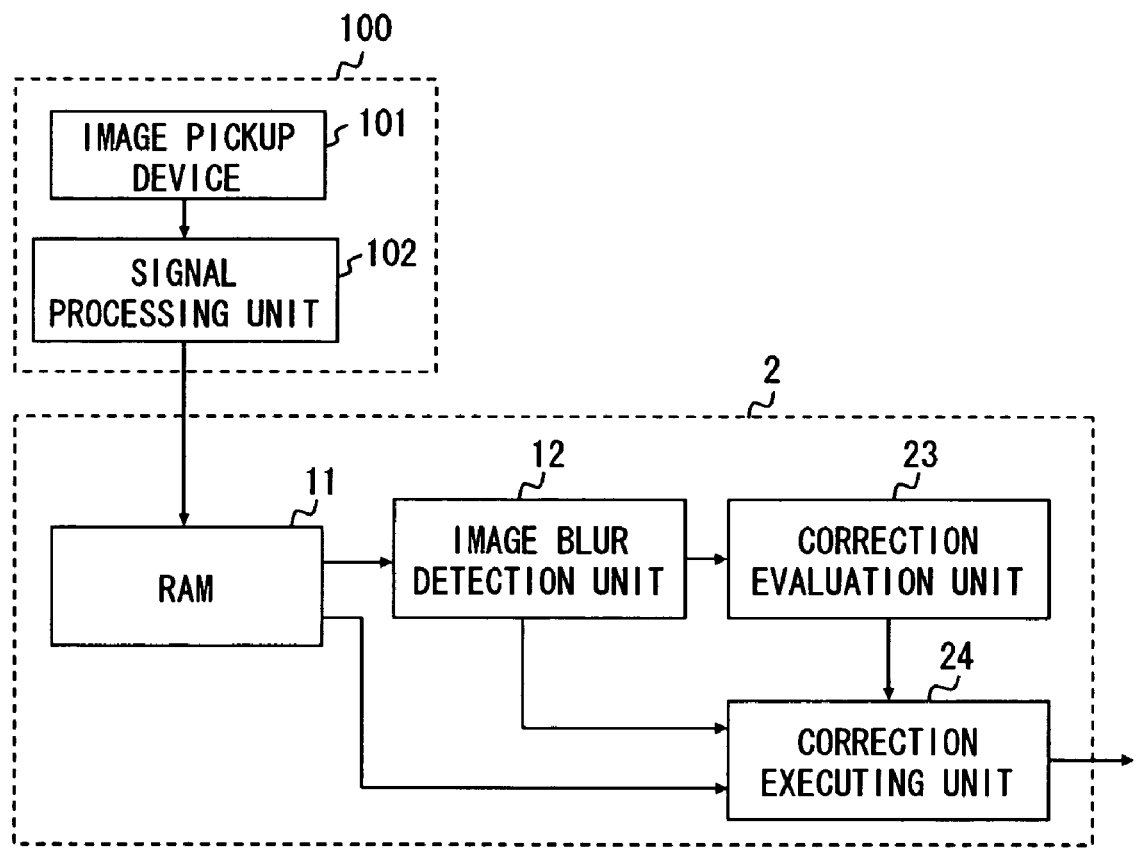
FIG. 4 is a functional block diagram illustrating the image stabilization apparatus according to second embodiment of the present invention.

A configuration of an image stabilization apparatus 2 of this embodiment is shown in FIG. 4. The image stabilization apparatus 2 differs from the image stabilization apparatus 1 in a selection procedure of image data in the correction evaluation unit 23 and the combination of the image data used for the image stabilization in the correction executing unit 24. Other components of the image stabilization apparatus 2 are identical to those in the image stabilization apparatus 1. In FIG. 4, components identical to those in the first embodiment are denoted by reference numerals identical to those therein with detailed description omitted.

Figure 5:
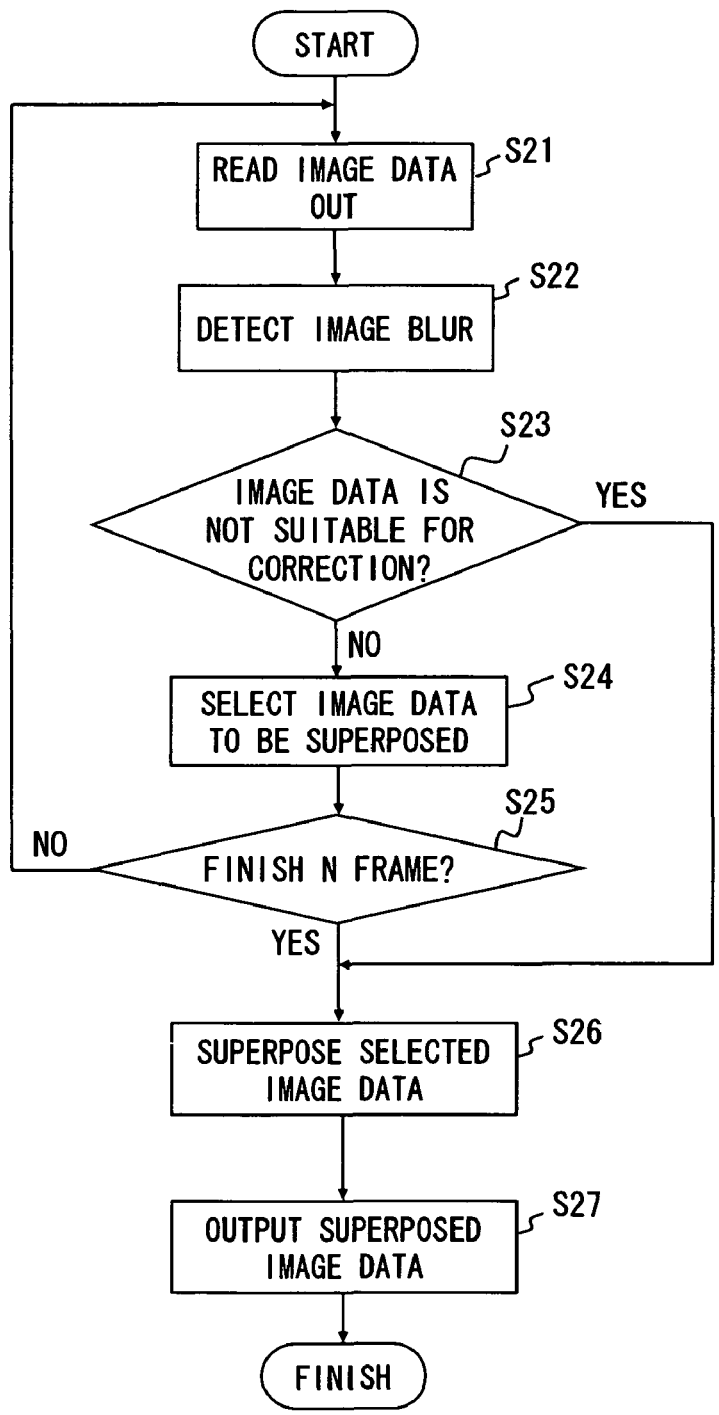
FIG. 5 is a flow chart illustrating the image stabilization process according to second embodiment of the present invention.

A detailed procedure of the image stabilization apparatus 2 of this embodiment is described hereinafter with reference to a flowchart of FIG. 5. In step S21, the image blur detection unit 12 reads out two image data to be compared to calculate the image blur from the RAM 11. This step is identical to the step S11 of FIG. 2. In step S22, the image blur between the two image data being read out from the RAM 11 is detected. This step is identical to step S12 of FIG. 2. In step S23, the image blur detected in step S22 is evaluated whether it is suitable for the image stabilization by superposing. This step is identical to step S13 of FIG. 2.

In case the image data compared with the first image data is evaluated to be suitable for the correction, proceed to step S24. In step S24, return to step S21 in case the correction evaluation unit 23 has not completed evaluating to the image data of the last N frame, so as to select an unevaluated image data to repeat the processes.

When completed to evaluate the motion vectors among the first image data and other N−1 sheets of image data with an evaluation that there is no image data not suitable for the correction in step S23, the correction executing unit 14 performs the superposition using the image data of all the N frames (step S26).

On the other hand in case it is evaluated that there is image data not suitable for the correction, the detection and evaluation of the motion vector are ended, and then proceed to step S26. In this case, in step S26, the superposing process is performed using the image data selected to be used for the image stabilization and the first image data. In this case as with the first embodiment, the luminance is corrected depending on the number of image data used for the superposition.

In step S27, the image data with its image blur corrected by the superposition is output and the process is completed.

That is, the image stabilization apparatus 2 calculates the motion vector and detects the image blur along time series from the first image data. Then in case a mth image data is evaluated to be not suitable for the correction, the image stabilization apparatus 2 outputs the image data generated by superposing the image data from the first to m-lth as the image data with its image blur corrected. m is an integer between 2 and N. Firstly, a deterioration of image quality such as an emphasis of subject blur can be suppressed because the image data not suitable for the correction is not included to be superposed.

Secondly, the random noise generated in the corrected image data can be reduced and the image quality can be improved because more image data can be used to correct the image blur as compared to the image stabilization apparatus 1 of the first embodiment.

Thirdly, at a point of evaluating the image data not suitable for the correction by the superposition, the motion vectors thereinafter are not evaluated and the process proceeds to generate the corrected data. This helps generate the corrected image data quickly.

Other Embodiment

The image stabilization apparatus 2 described above sequentially performs in order of image capture, the calculation of the motion vector between the first image data among the consecutively captured N frames and N−1 image data excluding the first frame, and then detects the image blur. The image stabilization apparatus 2 corrects the image blur using the image data evaluated possible to be superposed and the first image data at a time of evaluating that there is the image data having the motion vector not suitable for the correction. However even in case it is evaluated that there is image data not suitable for the correction, the calculation of the motion vector of the image data of the last N frame may be performed. That is, in the flowchart of FIG. 5, an arrow of YES for step S23 may be connected to the arrow before S25. In this way, even though the image data not suitable for the correction by superposing exists in the image data group of N frames, maximum number of the image data suitable for the correction can be obtained. Accordingly in light of reducing random noise, maximum effect can be achieved.

That is, even with the image data not suitable for the correction included in the consecutive image data, the image data captured after that may include motion vector suitable for the image stabilization by the superposition as with FIG. 3A. Accordingly by the above operation, the image data used for superposing can be made as large as possible, thereby reducing random noise and improving image quality of the image data with its image blur corrected.

In the first and second embodiments, the calculation of the motion vector and the image blur evaluation process are performed for the first image data among N frames consecutively captured and N−1 sheets of image data after the first frame. However the detection and the evaluation of the motion vector may be performed for the image data chronologically positioned to back and forth, for example for the first image data and a image data of second frame, or the image data of second frame and a image data of third frame. By these processes, in case the first image data has small number of pixel features and not suitable for evaluating the motion vector, the first image data can be excluded from the superposition process so that other image data excluding the first image data can be used to superpose.

In case there are plurality of combinations of the image data that can be corrected, for example with N=4, the first image data and a second frame of the image data can be corrected, and a third and a fourth frame of the image data can also be corrected, it is desirable to correct the image blur with the combination including the first image data. This is because that the first image data is an image captured at the time closest to the timing of pressing a shutter, and it is highly possible that the first image data is the one a user is expecting to be.

In the first and the second embodiments described above, the motion vector is calculated by detecting a change in luminance of the image data, and a characteristic of the image blur is evaluated based on the calculated motion vector. However the motion vector of the image data may be calculated using an acceleration sensor that detects a blur at a time of capturing by a camera including the imaging unit 100 and the image stabilization apparatus 1 or 2.

It is apparent that the present invention is not limited to the above embodiment and it may be modified and changed without departing from the scope and spirit of the invention.

What is claimed is:

1. An image stabilization apparatus, comprising:
   a detection unit detecting an amount of an image blur between first captured image data and other image data included in a plurality of consecutively captured image data;
   an evaluation unit selecting at least one image data as appropriate image data to use in correcting image blur from the plurality of consecutively captured image data according to a result of the detection of the amount of image blur; and
   a correction unit generating corrected image data with its image blur corrected using the appropriate image data and excluding the image data not selected by the evaluation unit, wherein the evaluation unit:
is configured to be capable of determining, in time series of an image capturing from a second captured image data, whether the image data is suitable for an image stabilization by superposing with the first captured image data; and
in case of determining $m^{th}$ image data is not suitable for the image stabilization, selects at least one image data as the appropriate image data from the first captured image data to m−$1^{th}$ image data without selecting the $m^{th}$ image data or later, wherein m is an integer larger than or equal to 2.

2. The image stabilization apparatus according to claim 1, wherein the correction unit generates the corrected image data by superposing the appropriate image data to cancel out the amount of image blur.

3. The image stabilization apparatus according to claim 2, wherein when the number of the appropriate image data is less than a predetermined amount, the correction unit generates the corrected image data by superposing at least one of the appropriate image data for a plurality of times so as to adjust a luminance of the corrected image data to a specified luminance corresponding to the predetermined number.

4. The image stabilization apparatus according to claim 1, wherein the evaluation unit selects only one image data as the appropriate image data form the first captured image data to the m−$1^{th}$ image data.

5. The image stabilization apparatus according to claim 4, wherein the only one image data is the first captured image data.

6. The image stabilization apparatus according to claim 1, wherein the evaluation unit selects all of the first captured image data to the m−$1^{th}$ image data as the appropriate image data.

7. The image stabilization apparatus according to claim 1, wherein the detection unit sequentially detects an amount of an image blur between consecutive two image data.

8. An image stabilization method for correcting an image blur by an image stabilization apparatus, the method comprising:
detecting an amount of an image blur between first captured image data and other image data included in a plurality of consecutively captured image data using a detection unit;
selecting at least one image data as appropriate image data to use in correcting image blur from the plurality of consecutively captured image data according to a result of the detection of the amount of image blur using an evaluation unit; and
generating corrected image data with its image blur corrected using the appropriate image data and excluding the image data not selected for the appropriate image data using a correction unit,
wherein the selecting step includes:
determining, in time series of an image capturing from a second captured image data, whether the image data is suitable for an image stabilization by superposing with the first captured image data; and
in case of determining $m^{th}$ image data is not suitable for the image stabilization, selecting at least one image data as the appropriate image data from the first captured image data to m−$1^{th}$ image data without selecting the $m^{th}$ image data or later, wherein m is an integer larger than or equal to 2.

9. The image stabilization method according to claim 8, wherein the selecting step comprises selecting only one image data as the appropriate image data from the first captured image data to the m$1^{th}$ image data.

10. The image stabilization method according to claim 9, wherein the only one image data is the first captured image data.

11. The image stabilization method according to claim 8, wherein the selecting step comprises selecting all of the first captured image data to the m−$1^{th}$ image data as the appropriate image data.

12. The image stabilization method according to claim 8, wherein the generating step comprises generating the corrected image data by superposing the appropriate image data to cancel out the amount of image blur.

13. The image stabilization method according to claim 8, wherein the detecting step comprises sequentially detecting an amount of an image blur between consecutive two image data.

14. A computer program product for executing an image stabilization process by an image stabilization apparatus, wherein the image stabilization process comprises:
detecting an amount of an image blur between first captured image data and other image data included in a plurality of consecutively captured image data using a detection unit;
selecting at least one image data as appropriate image data to use in correcting image blur from the plurality of consecutively captured image data according to a result of the detection of the amount of image blur using an evaluation unit; and
generating corrected image data with its image blur corrected using the appropriate image data and excluding the image data not selected for the appropriate image data using a correction unit,
wherein the selecting step includes:
determining, in time series of an image capturing from a second captured image data, whether the image data is suitable for an image stabilization by superposing with the first captured image data; and
in case of determining $m^{th}$ image data is not suitable for the image stabilization, selecting at least one image data as the appropriate image data from the first captured image data to m−$1^{th}$ image data without selecting the $m^{th}$ image data or later, wherein m is an integer larger than or equal to 2.

15. The computer program product according to claim 14, wherein the selecting step comprises selecting only one image data as the appropriate image data from the first captured image data to the m−$1^{th}$ image data.

16. The computer program product according to claim 15, wherein the only one image data is the first captured image data.

17. The computer program product according to claim 14, wherein the selecting step comprises selecting all of the first captured image data to the m−$1^{th}$ image data as the appropriate image data.

18. The computer program product according to claim 14, wherein the generating step comprises generating the corrected image data by superposing the appropriate image data to cancel out the amount of image blur.

19. The computer program product according to claim 14, wherein the detecting step comprises sequentially detecting an amount of an image blur between consecutive two image data.

* * * * *